(12) United States Patent
Singleton, Jr.

(10) Patent No.: US 6,445,579 B1
(45) Date of Patent: Sep. 3, 2002

(54) REMOVABLE PERIPHERAL DEVICE WITH EXPOSED COVER SERVING AS HANDLE

(75) Inventor: Charles W Singleton, Jr., Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/811,761

(22) Filed: Mar. 19, 2001

(51) Int. Cl.[7] .................................................. H05K 7/20
(52) U.S. Cl. .......................... 361/686; 361/754; 248/65; 710/102
(58) Field of Search ................................. 361/686–687, 361/727, 726, 732, 740, 754, 798, 801; 710/102; 360/97.8; 248/65

(56) References Cited

U.S. PATENT DOCUMENTS 6,018,456 A * 1/2000 Young et al. ................ 361/684
6,145,746 A * 11/2000 Bard et al. ............. 235/472.01
6,188,573 B1 * 2/2001 Urita .......................... 361/687

* cited by examiner

Primary Examiner—Darren Schuberg
Assistant Examiner—Hung Van Duong

(57) ABSTRACT

A removable internal peripheral unit includes an externally exposed cover which is translatable, self-actuating, rotatable and self-centering. The cover serves as a handle for removing and installing the peripheral device. The cover is unsnapped and translated by the operator. It then self-actuates into a rotatable position. As the operator continues to pull on the cover, the cover rotates into a position from which the operator has improved leverage for disconnecting and removing the peripheral device. During installation, the cover moves within a defined track which self centers the cover relative to the internal compartment opening, fitting the cover to the surrounding computer case.

20 Claims, 4 Drawing Sheets

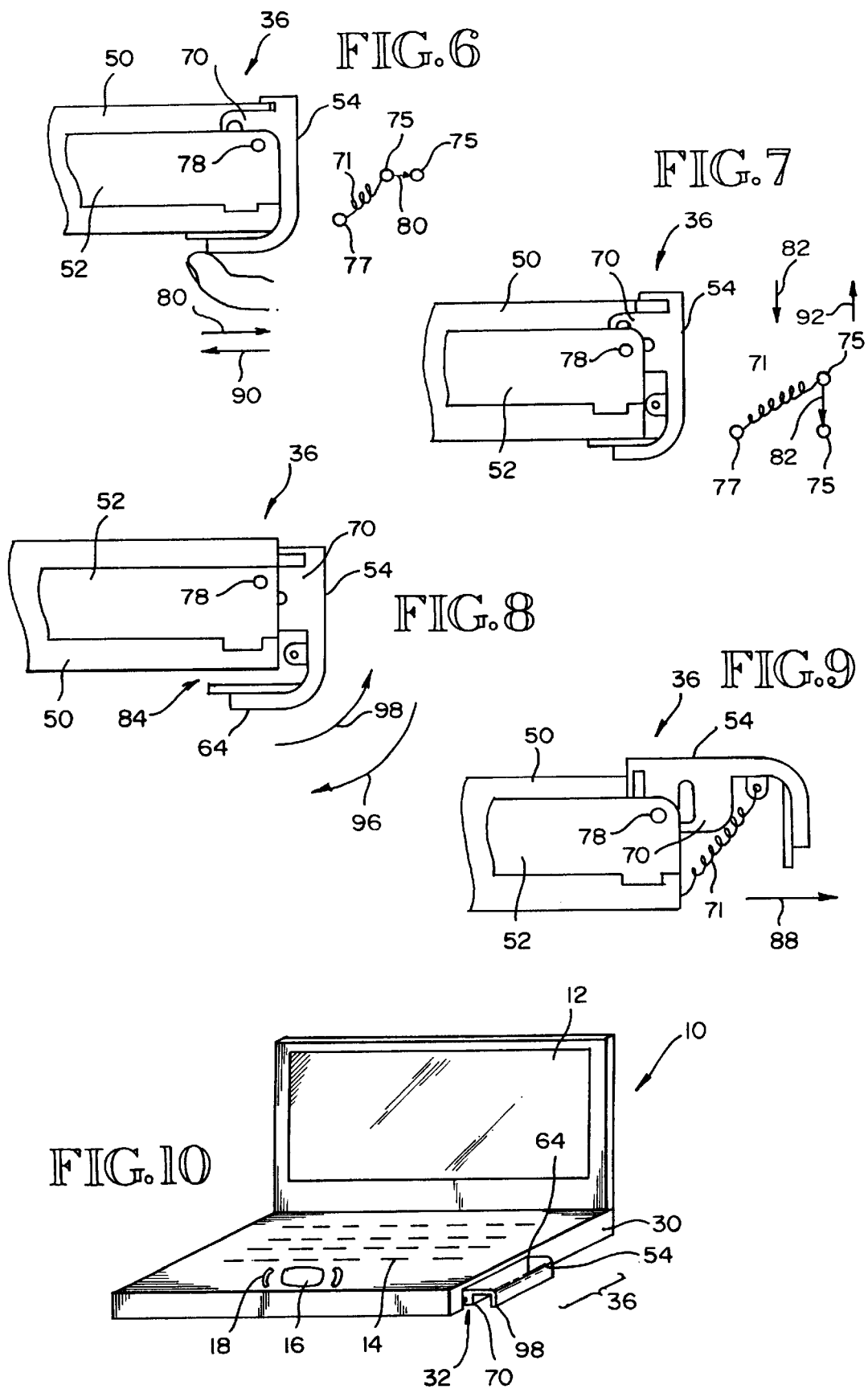

REMOVABLE PERIPHERAL DEVICE WITH EXPOSED COVER SERVING AS HANDLE

BACKGROUND OF THE INVENTION

This invention relates to computer system devices and ergonomics, and more particularly to an external cover apparatus for a removable peripheral device.

It is desirable for a portable computer to be light in weight, while still offering the features and computing power comparable to desktop computers. One approach for achieving both objectives is to allow removal or "swapping" of peripheral devices at a common internal compartment or compartment. However, portable computers having removable peripheral devices exhibit ergonomic challenges. Specifically, the exposed surface area of a peripheral device needs to conform to the ergonomics of the computer case. There also is a need to be able to remove the device and insert another device in an efficient manner. These needs are addressed by the subject matter described herein.

Portable "personal" computers have developed from the early cumbersome suitcase design to smaller laptop designs to the now commercially-predominant notebook, sub-notebook and palm top computers. The typical portable computer includes a display screen housing hinged to a keyboard housing. The display screen housing folds down against the keyboard where the two housings latch together. A disk drive often is mounted in the keyboard housing. Additional features include a docking connector, input/output ports and one or more compartments or expansion compartments for receiving PCMCIA cards, (peripheral devices conforming to the Personal Computer Memory Card International Association (PCMCIA) standards for personal computer-based peripherals) or removable peripheral devices.

It is desirable to support a wide range of peripheral devices at the internal compartment. A removable peripheral device is inserted into the internal compartment. The contents of the internal compartment may change based on an operator's current need. For example, they may desire to provide a lighter weight system and keep the compartment empty. Alternatively, they may desire to insert a floppy drive or a CD-ROM to handle transportable media. The internal compartment also may be dedicated to a hard disk drive or be one of multiple compartments - a dedicated compartment and an expansion compartment One challenge for manufacturers of the devices to be inserted into the compartment is in meeting the tolerances of the compartment and in conforming to desired ergonomic features of the surrounding computer case. For ease of use it also is desirable to provide a manner for easily installing and removing the peripheral device from the internal compartment.

SUMMARY OF THE INVENTION

According to the invention, a removable internal peripheral unit includes an externally exposed cover which forms part of the host computer's outer profile.

According to one aspect of the invention, the cover also serves as a handle for removing the peripheral device.

In an exemplary embodiment the cover is any one or more of translatable, rotatable and self-centering to allow easy removal of the peripheral. When the peripheral unit is installed, the cover motions enable the cover to home to a location within desired tolerances and conform ergonomically to the surrounding computer case profile.

For example in one method of insertion/removal, the cover is translated by the operator and then self-actuates into a rotatable position. As the operator pulls on the cover, the cover translates, then self-actuates to a new position. Continued pulling rotates the door providing leverage for pulling the peripheral device. The operator pulls on the device disconnecting the peripheral device connector, then easily removes the peripheral device from the externally-accessed internal compartment.

An advantage of the invention is that an attractive cover is matched to the surrounding computer case in an ergonomically friendly and stylish manner, while also allowing the utility for access to the removable, internal peripheral unit. Another advantage is that the cover is operator friendly undergoing a motion that makes it easy to remove and install a peripheral unit into the internal compartment. These and other aspects and advantages of the invention will be better understood by reference to the following detailed description taken in conjunction with the accompanying drawings.

BRIEF DESCRIPTION OF THE DRAWINGS

FIG. 6 is a perspective view of the portable computer with a peripheral unit received in the internal compartment;

FIG. 7 is a perspective view of the computer of FIG. 6 with the cover unlocked;

FIG. 8 is a perspective view of the computer of FIG. 6 with the cover translated.

FIG. 9 is a perspective view of the computer of FIG. 6 with the cover rotated; and FIG. 10 is a perspective view of the computer of FIG. 6 with the cover moved into position as a handle for the peripheral unit to be removed or installed.

DESCRIPTION OF SPECIFIC EMBODIMENTS

Figure 1:
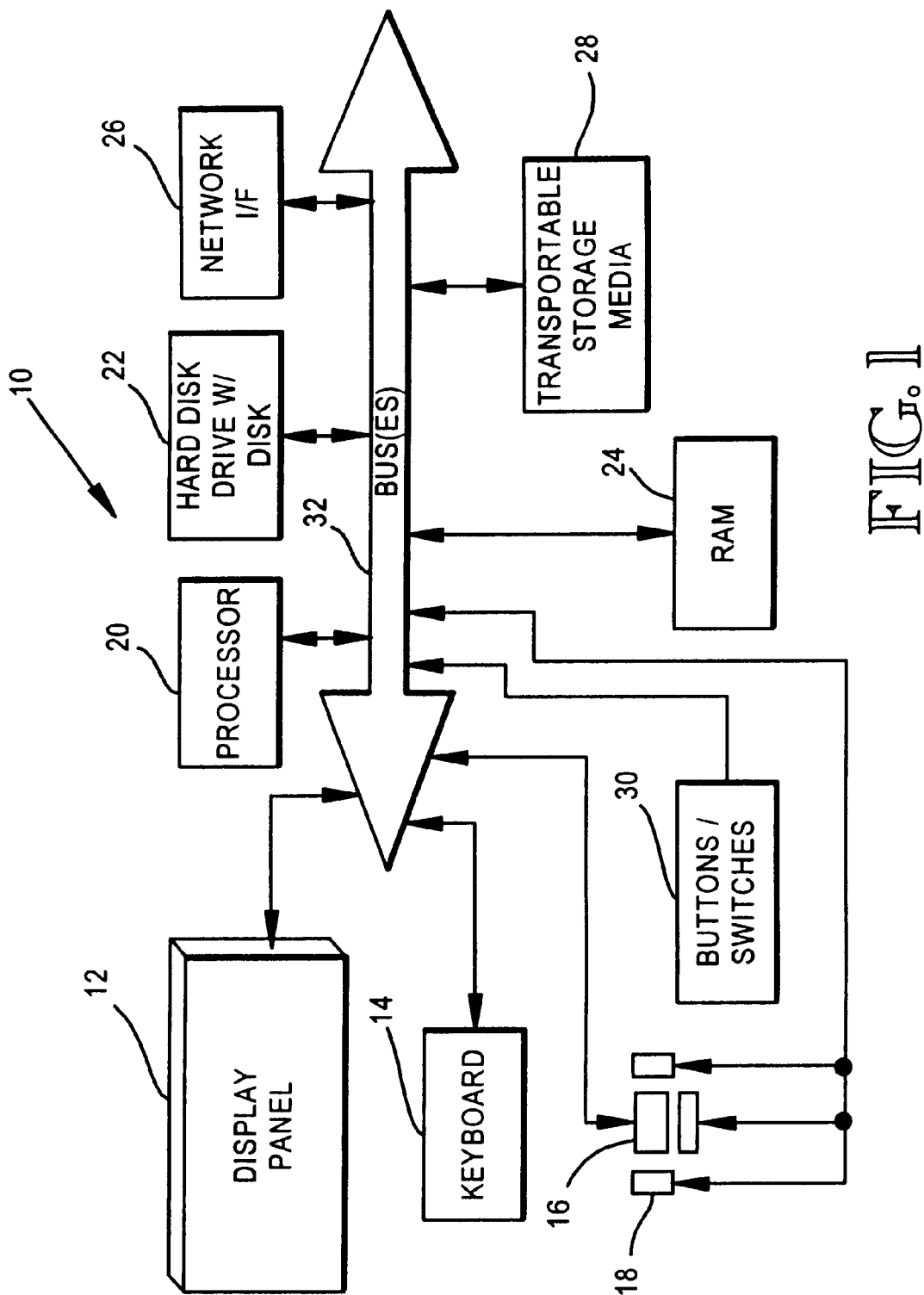
FIG. 1 is a block diagram of a portable computer.

The functions of the present invention preferably are performed by a portable computer 10 of the type which is well known in the art, an example of which is shown in FIG. 1. In an exemplary embodiment the computer system 10 is a notebook-style computer system. In other embodiments the portable computer is a sub-notebook computer, palmtop computer or other hand-help, laptop, or other mobile or portable computing device.

The portable computer 10 includes a display device, one or more input devices, a processing device and one or more wired or wireless ports for interfacing with a peripheral device. In an exemplary embodiment, the computer 10 includes a display panel 12, a keyboard 14, a pointing device 16, a clicking device 18, a processor 20, and random access memory 24. Additionally, the computer 10 includes in some embodiments a hard disk drive with hard disk 22, a network interface 26 (e.g., modem, ethernet adapter, infrared adapter), a transportable storage media drive 28 and media (e.g., CD-ROM drive, DVD-ROM drive, floppy disk drive, zip drive, bernoulli drive), and one or more extra buttons/ switches 30. The various components interface and exchange data and commands through one or more busses 32. The computer system 10 receives information by entry through the keyboard 24, pointing/clicking devices 16/18, the network interface 34, or another input device or input port.

Figure 2:
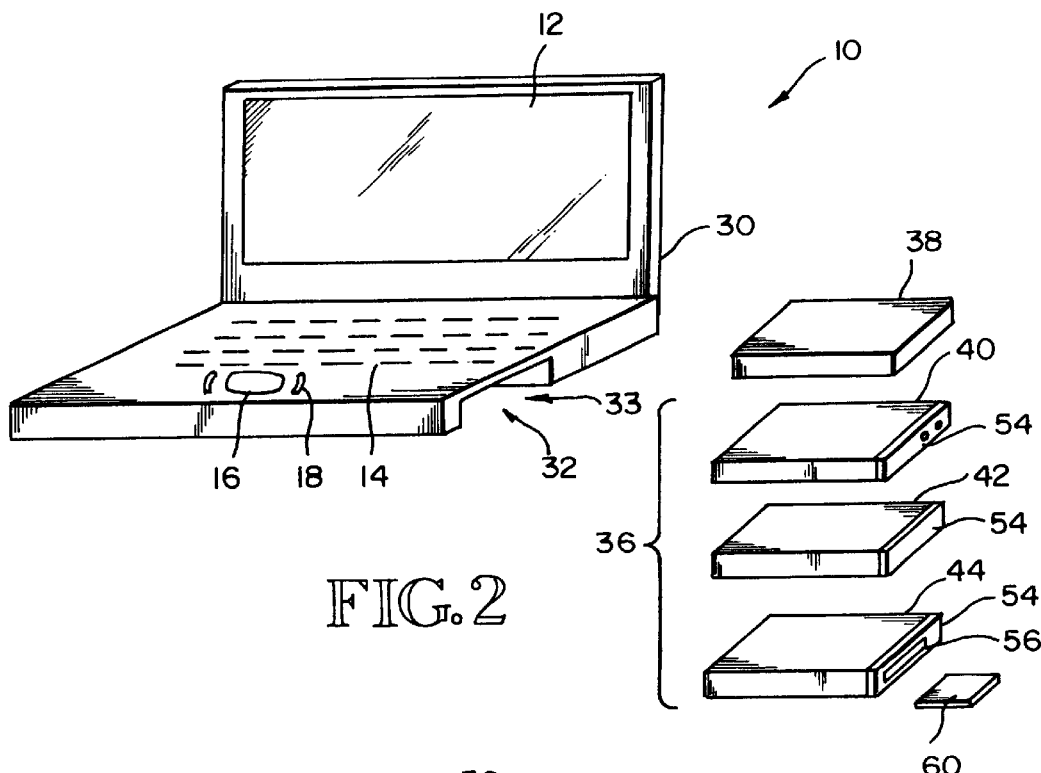
FIG. 2 is a perspective view of the portable computer of FIG. 1 with optional peripheral units.
Figure 3:
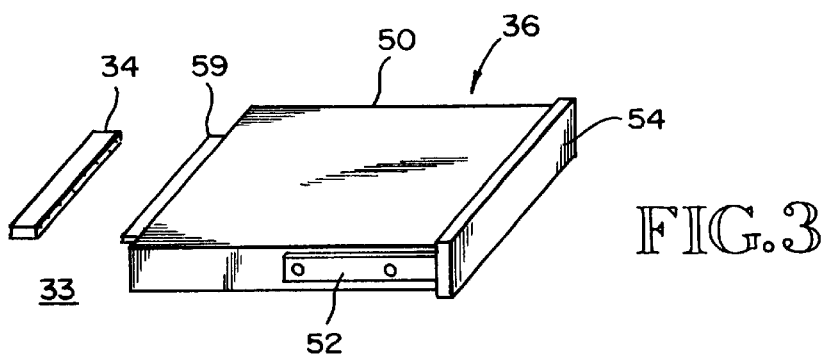
FIG. 3 is a diagram of an exposed internal compartment of the computer of FIG. 1 with a corresponding peripheral unit.

The portable computer 10 components are housed in a case 30, such as shown in FIG. 2. The case has an opening 32 to an internal compartment 33 with an internal compartment connector 34 (see FIG. 3). In a preferred embodiment the internal compartment 33 receives a peripheral unit 36 or a space holder 38. Exemplary units 36 include a battery pack 40, a fixed media drive 42, and a removable media drive 44. The battery pack 40 preferably serves as a second battery power source for the computer 10, although it can serve as the primary or only battery supply in other embodiments. In one embodiment the fixed media drive 42 is a hard disk drive with an internal hard disk. The removable media drive 44 is any of a floppy disk drive, a CD-ROM drive, DVD-ROM drive, a magneto-optical drive, or other drive into which a media can be inserted and removed.

The peripheral units 36 each include a peripheral device 50, a mount 52 and an identification cover 54. In one embodiment the cover 54 is part of the mount 52 to which a form-fit peripheral device 50 is attached. The mount 52 orients the peripheral device 50 and device connector 59 relative to the internal compartment connector 34. The cover 54 moves relative to the fixed mount 52 and form-fit peripheral device 50. Alternatively, the mount 52 and/or cover 54 are integral to the peripheral device 50. In either embodiment the peripheral device 50 with mount 52 and cover 54 are referred to herein as a peripheral unit 36.

Figure 4:
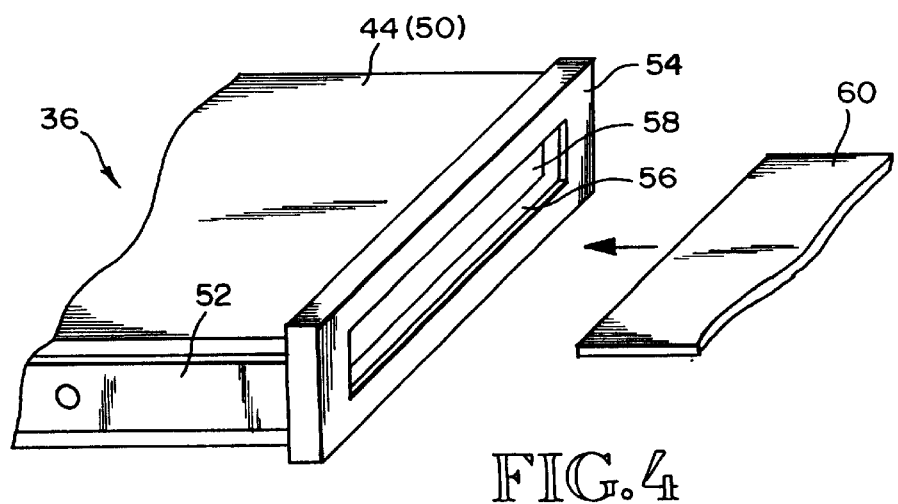
FIG. 4 is a partial view of a removable media drive peripheral unit and removable media.

For the removable media drive 44 embodiments, the cover 54 includes an opening 56 (see FIGS. 2 and 4) through which a removable media 60 is loaded into the removable media drive 44. In some of such removable media drive embodiments, either the peripheral device 50 or the cover 54 also includes a door 58 within the opening 56 that opens in response to the insertion of the removable media 60.

Peripheral Unit Cover

When the peripheral unit 36 is installed, the cover 54 fills the opening 32 and forms a portion of the outer profile of the computer 10. Accordingly, the cover 54 preferably conforms to tolerances of the opening 32 in the computer case 30. In some embodiments the cover conforms to the adjacent profile of the computer case 30, providing a flush surface. In other embodiments the cover 54 extends to a varied height relative to the adjacent case profile—being either recessed or heightened.

Figure 5A:
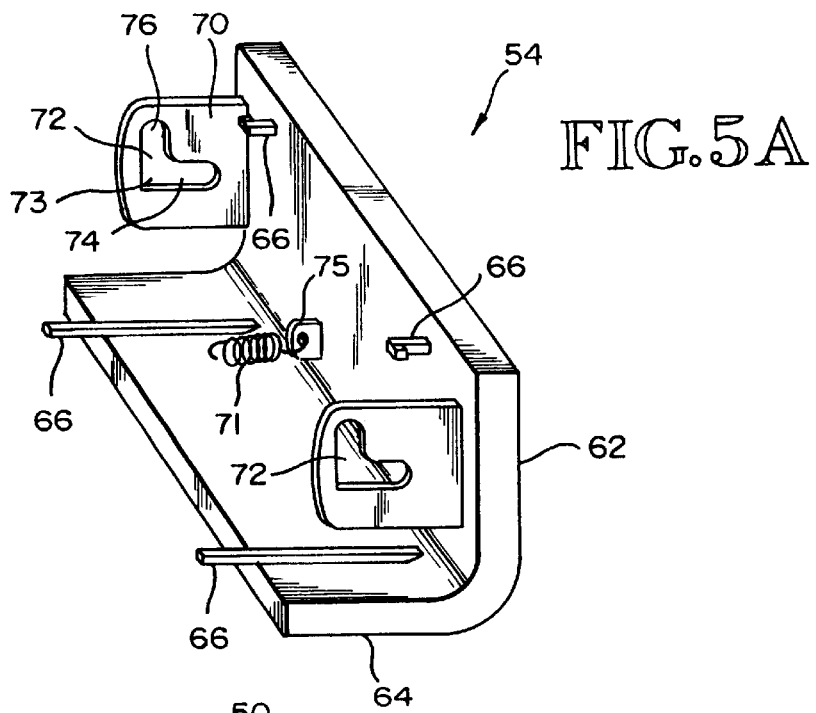
FIGS. 5a–c are partial views of the cover, peripheral device and mount of FIG. 3

Referring to FIG. 5a, in one embodiment the cover 54 includes a face portion 62 defining an outer surface visible while the peripheral unit 36 is installed. The cover 54 also includes a second portion 64 oriented in a different manner than the face portion 62 to allow a user to grasp the cover 54. In the embodiment illustrated the second portion 64 is graspable by an operator that reaches under the peripheral unit 36 at the opening 32. Such under portion 64 is oriented at an angle relative to the face portion 62. The second portion 64 in other embodiments has a differing orientation (e.g., a side portion, a recessed portion). The second portion 64 provides access for an operator to move the cover 54 relative to the peripheral device 36.

Figure 5B:
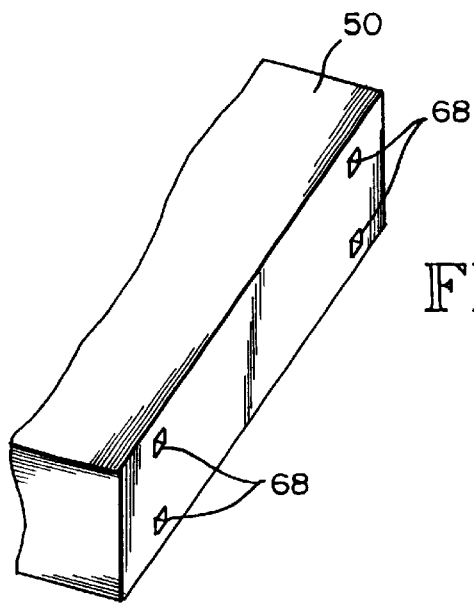

The cover 54 also includes a plurality structures 66 which secure the cover 54 into a stable position while the peripheral unit 36 is installed. In one embodiment the structures 66 are formed by a set of extensions which mate into openings 68 of the peripheral device 50 (see FIG. 5b). The extensions 66 latch the cover 54 into a stable position relative to the peripheral device 50. In other embodiments, alternative structures 66 serve to secure the cover 54 into a stable position. In addition, a spring 71 biases the cover toward a closed position relative to the mount 52 and peripheral device 50. The spring 71 is connected to the cover 54 at a member 75 and to the mount 52 at a member 77.

Figure 5C:
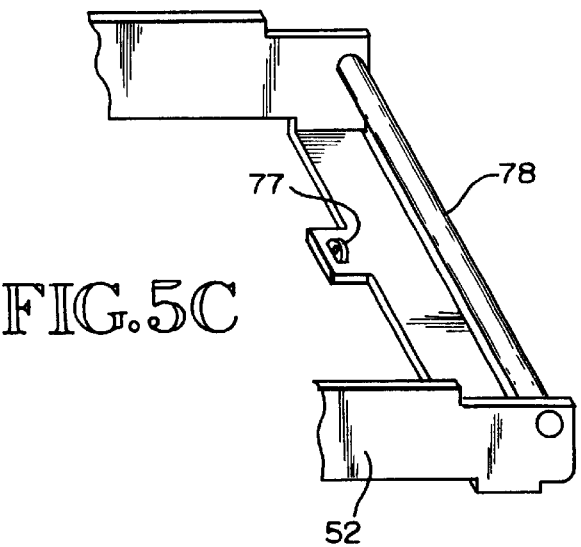

Referring to FIGS. 5a and 5c, the cover 54 also includes a frame portion 70 which defines a track 72. The track 72 is an opening within the frame portion 70. In a specific embodiment, the track 72 extends in two directions from a vertex 73. One portion 74 extends along the direction of the opening 32 into the compartment 33. The other portion 76 extends in another direction (e.g., perpendicular to the direction of the first portion). The specific orientations of the track portions 72, 74 may vary in other embodiments. In a corresponding embodiment the mount 52 includes a cam 78 which runs within the track 70. In the illustrated embodiment there are two aligned frame portions 70 of the cover and a single cam 78 running in the two tracks 72. In another embodiments there are two cams 78 and two tracks 72. In yet another embodiment, the cam 78 is part of the cover 54 and the tracks 72 are defined as a structure(s) of the mount 52.

The spring 71 biases the cover 54 relative to the mount 52. In a preferred embodiment the connectors 75, 77 to which the spring 71 attaches are located to hold the cover 54 in a closed position against the mount 52 and peripheral device 50 when the cover is closed. Specifically, when the cam 78 is at the end of portion 74 of track 72, the spring 71 biases the cover 54 to keep the cam 78 be at such end.

Method for Inserting and Removing Peripheral Unit

While the peripheral unit 36 is installed in the computer 10, the cover 54 is secured in a stable position and forms a part of the outer profile of the computer. Referring to FIG. 6, the cover 54 is unlatched from the peripheral device 50 by a decoupling force applied by an operator. The operator exerts the decoupling force at the second portion 64 of the cover and pulls the cover outward relative to a plane of the computer case in opposition to the biasing force of spring 71. In some embodiments notches are recessed into the second portion 64 to make grasping the second portion 64 easier. The operator also may reach to an edge of the second portion 74 to use leverage in applying the decoupling force.

In what is either a continuation of the same force, or an application of another force, the operator translates the cover 54 in a direction 80 (see FIG. 6) relative to the peripheral unit 50 and mount 52. During such translation, the relative motion between the cam 78 and tracks 72 is such that the cam 78 moves relative to the track portion 74 toward the vertex 73—again against the biasing force of spring 71. Once the cam reaches the vertex 73, the cover slides along the track portion 76 away from the vertex. In some embodiment such relative motion along track portion 76 is due to gravity. In the illustrated embodiment the cover is biased along the track portion 76 by the spring 71. Specifically, the cover 54 moves in a direction 82 (see FIG. 7) in what is referred to herein as a self-actuating motion.

With the cam 78 at the distal end of track portion 76 (see FIGS. 5a, and 8), the cover 54 is now lower compared to the previously secured position. At the cover's lower position the second portion 64 is slightly separated from the peripheral device 50 leaving a gap 84 into which the operator can reach with fingertips to apply additional leverage. The operator applies a force which rotates the cover 54 in opposition to the biasing force of spring 71 in a motion 86 swinging the cover 54 from the position shown in FIG. 8 to the position shown in FIGS. 9 and 10. The cover 54 rotates about the cam 78 at the distal end of the track portion 76. The operator then exerts a force to pull the peripheral unit 36 from the opening 32. Referring to FIG. 10, the cover 54, and in particular the second portion 64, serves as a handle 98 for removing the peripheral unit 36 from the opening 32 of the computer case 30. The cover 54 remains in the handle position while the operator holds the cover 54.

Note that the various forces applied by the operator may be applied in individual steps to unlatch, translate, and rotate the cover and remove the unit 36. Also, a single continuous force may be applied accomplishing each of the motions with the self-actuating motion occurring along the way. Whether applied in steps or in a continuous motion, the force or forces are referred to herein as being an extractive force. In some methods of removal the extractive force includes the decoupling force. In other methods of removal the decoupling force is a distinct force and motion from the extractive force.

To insert the peripheral unit 36, the unit 36 is slid into the compartment 33 through the opening 32 of the computer case 30 (see FIG. 1). During such insertion the cover preferably is oriented as shown in FIG. 9. The peripheral unit 36 is sized to tolerance relative to the opening 32 and compartment 33 to slide along a repeatable path bringing a connector 59 of the peripheral device 50 into mated engagement with a connector 34 of the computer 10. The operator exerts sufficient force to achieve such mated engagement. Once the unit is inserted and connectors 59/34 engaged, the operator releases the cover 54, and the spring 71 biases the cover to rotate in direction 96, translate in direction 92, then translate in direction 90. In some embodiments, either alternatively or in addition, the operator rotates the cover 54 in a direction 96 (opposite the direction 86), then lifts the cover in direction 92 to move the cover relative to the cam 78. In effect the cam moves relatively from the distal end of track portion 76 to the vertex 73 (see FIG. 7). The operator then applies a translational force to push the cover 54 inward in a direction 90 toward the computer. The translational motion in effect moves the cam 78 from the vertex toward the distal end of track portion 74. At the end of such translational motion, the operator exerts a force to bring the extensions 66 into latched engagement within the peripheral device 50. The cover 54 is then in a secure position relative to the peripheral device 50 with the peripheral unit 36 installed and connected for operation. Further the peripheral unit 36 is secured in the compartment 33. The cover 54 forms a portion of the outer profile of the computer 10.

Meritorious and Advantageous Effects

An advantage of the invention is that an attractive cover is matched to the surrounding computer case in an ergonomically friendly and stylish manner, while also allowing the utility for access to the removable, internal peripheral unit. Another advantage is that the cover is operator friendly undergoing a motion that makes it easy to remove and install a peripheral unit into the internal compartment.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A removable peripheral apparatus insertable into an exposed compartment of a computer system through an opening in a case of the computer system, the apparatus comprising:
   a peripheral unit;
   a cover coupled to the peripheral unit forming an external surface at said opening, wherein the cover moves relative to the peripheral unit into a position for leveraging an extractive force applied by an operator at the movable cover to disconnect and remove the peripheral apparatus from the exposed compartment.

2. The apparatus of claim 1, in which the movable cover, while in the leveraging position, defines a shape which is graspable by an operator for applying the extractive force.

3. The apparatus of claim 1, in which the peripheral unit comprises a peripheral device from the group of peripheral devices including: a fixed media disk drive and a removable media disk drive.

4. The apparatus of claim 1, in which the peripheral unit comprises a peripheral device from the group of peripheral devices including: a hard disk drive, a floppy disk drive, a CD-ROM drive, a DVD-ROM drive, and a magneto-optical disk drive.

5. The apparatus of claim 1, in which the peripheral unit comprises a battery pack.

6. A removable peripheral apparatus insertable into an exposed compartment of a computer system through an opening in a case of the computer system, the apparatus comprising:
   a peripheral unit;
   a cover coupled to the peripheral unit forming an external surface at said opening, wherein the cover moves relative to the peripheral unit into a position for leveraging an extractive force applied by an operator to disconnect and remove the peripheral apparatus from the exposed compartment, in which the cover is movable in translation and rotation relative to the peripheral device responsive to the extractive force.

7. A removable peripheral apparatus insertable into an exposed compartment of a computer system through an opening in a case of the computer system, the apparatus comprising:
   a peripheral unit;
   a cover coupled to the peripheral unit forming an external surface at said opening, wherein the cover moves relative to the peripheral unit into a position for leveraging an extractive force applied by an operator to disconnect and remove the peripheral apparatus from the exposed compartment, in which the cover comprises a track which defines a path of the translation motion of the cover relative to the peripheral unit, and wherein the peripheral unit comprises a cam which runs in the track and about which the cover rotates.

8. A removable peripheral apparatus insertable into an exposed compartment of a computer system through an opening in a case of the computer system, the apparatus comprising:
   a peripheral unit;
   a cover coupled to the peripheral unit forming an external surface at said opening, wherein the cover moves relative to the peripheral unit into a position for leveraging an extractive force applied by an operator to disconnect and remove the peripheral apparatus from the exposed compartment, in which the peripheral unit comprises a peripheral device and a mount to which the peripheral device is fixedly attached, and wherein the cover moves relative to the mount.

9. A removable peripheral apparatus insertable into an exposed compartment of a computer system through an opening in a case of the computer system, the apparatus comprising:

a peripheral unit;

a cover coupled to the peripheral unit forming an external surface at said opening, wherein the cover moves relative to the peripheral unit into a position for leveraging an extractive force applied by an operator to disconnect and remove the peripheral apparatus from the exposed compartment, in which the peripheral unit comprises a removable media disk drive having a door within the cover, and wherein the door has motion which is independent of the motion of the cover.

10. A computing system, comprising:

a key entry device;

a display;

a peripheral unit; and a case having an opening to a compartment for receiving the peripheral unit into the compartment, the opening exposed to an external environment of the computing system;

wherein the peripheral unit comprises a peripheral device and a cover which is movable relative to the peripheral device responsive to an extractive force applied by an operator at the movable cover to disconnect and remove the peripheral unit from the internal compartment, wherein while the peripheral device unit is installed, the cover conceals said opening and forms a part of an external surface of the computing system, along with said case.

11. The system of claim 10, in which the movable cover, while in the leveraging position, defines a shape which is graspable by an operator for applying the extractive force.

12. The system of claim 10, in which the peripheral device comprises a device from the group of peripheral devices including: a fixed media disk drive and a removable media disk drive.

13. The system of claim 10, in which the peripheral unit comprises a peripheral device from the group of peripheral devices including: a hard disk drive, a floppy disk drive, a CD-ROM drive, a DVD-ROM drive, and a magneto-optical disk drive.

14. The apparatus of claim 10, in which the peripheral unit comprises a battery pack.

15. A computing system, comprising:

a key entry device;

a display;

a peripheral unit; and a case having an opening to a compartment for receiving the peripheral unit into the compartment, the opening exposed to an external environment of the computing system;

wherein the peripheral unit comprises a peripheral device and a cover which is movable relative to the peripheral device responsive to an extractive force applied by an operator to disconnect and remove the peripheral unit from the internal compartment, wherein while the peripheral device unit is installed, the cover conceals said opening and forms a part of an external surface of the computing system, along with said case, in which the cover is movable in translation and rotation relative to the peripheral device responsive to the extractive force.

16. A computing system, comprising:

a key entry device;

a display;

a peripheral unit; and a case having an opening to a compartment for receiving the peripheral unit into the compartment, the opening exposed to an external environment of the computing system;

wherein the peripheral unit comprises a peripheral device and a cover which is movable relative to the peripheral device responsive to an extractive force applied by an operator to disconnect and remove the peripheral unit from the internal compartment, wherein while the peripheral device unit is installed, the cover conceals said opening and forms a part of an external surface of the computing system, along with said case, in which the peripheral unit further comprises a mount to which the peripheral device is fixedly attached, and wherein the cover moves relative to the mount.

17. A computing system, comprising:

a key entry device;

a display;

a peripheral unit; and a case having an opening to a compartment for receiving the peripheral unit into the compartment, the opening exposed to an external environment of the computing system;

wherein the peripheral unit comprises a peripheral device and a cover which is movable relative to the peripheral device responsive to an extractive force applied by an operator to disconnect and remove the peripheral unit from the internal compartment, wherein while the peripheral device unit is installed, the cover conceals said opening and forms a part of an external surface of the computing system, along with said case, in which the cover comprises a track which defines a path of the translation motion of the cover relative to the peripheral unit, and wherein the peripheral unit comprises a cam which runs in the track and about which the cover rotates.

18. A computing system, comprising:

a key entry device;

a display;

a peripheral unit; and a case having an opening to a compartment for receiving the peripheral unit into the compartment, the opening exposed to an external environment of the computing system;

wherein the peripheral unit comprises a peripheral device and a cover which is movable relative to the peripheral device responsive to an extractive force applied by an operator to disconnect and remove the peripheral unit from the internal compartment, wherein while the peripheral device unit is installed, the cover conceals said opening and forms a part of an external surface of the computing system, along with said case, in which the peripheral unit comprises a removable media disk drive having a door within the cover, and wherein the door has motion which is independent of the motion of the cover.

19. A method for removing a peripheral unit from an internal compartment of a computing system which is accessible from an exterior of the computing system, the method comprising the steps of:

unlocking a cover of the peripheral unit;

translating the cover relative to the computing system;

self-actuating motion of the cover in another direction into a rotatable position;

rotating the cover; and disconnecting and removing the peripheral unit from the internal compartment after the step of rotating the cover.

20. The method of claim 19, in which the steps of translating, rotating, disconnecting and removing are in response to an extractive force applied by an operator to the cover.

* * * * *